(12) United States Patent
Pekar

(10) Patent No.: US 6,196,260 B1
(45) Date of Patent: Mar. 6, 2001

(54) FLOW CONTROL VALVE

(75) Inventor: Robert W. Pekar, Florence, MA (US)

(73) Assignee: Dielectrics Industries, Inc., Chicopee, MA (US)

( * ) Notice: Subject to any disclaimer, the term of this patent is extended or adjusted under 35 U.S.C. 154(b) by 0 days.

(21) Appl. No.: 09/422,392

(22) Filed: Oct. 21, 1999

Related U.S. Application Data
(60) Provisional application No. 60/105,123, filed on Oct. 21, 1998.

(51) Int. Cl.[7] .................................................. F16K 15/16
(52) U.S. Cl. ..................... 137/512.15; 137/844; 137/223
(58) Field of Search .................................... 137/844, 851, 137/843, 513.3, 223, 512.15, 493.8; 446/224; 297/DIG. 8; 138/46

(56) References Cited

U.S. PATENT DOCUMENTS

| | | |
|---|---|---|
| 1,068,167 | 7/1913 | Philblade . |
| 2,576,637 | 11/1951 | Patriquin . |
| 2,816,571 | 12/1957 | Pike . |
| 2,989,073 | 6/1961 | Goodwin . |
| 3,722,526 | 3/1973 | Henningsson . |
| 3,791,407 | 2/1974 | Nicholls . |
| 3,887,213 | 6/1975 | Goetz . |
| 4,310,013 | 1/1982 | McClaskey . |
| 4,552,133 | 11/1985 | Kawaguchi . |
| 4,633,910 | 1/1987 | Sugimura . |
| 4,674,532 | * 6/1987 | Koyanagi ......................... 137/512.15 |
| 4,708,167 | * 11/1987 | Koyanagi ......................... 137/512.15 |
| 4,917,646 | * 4/1990 | Kieves ................................ 446/224 |
| 5,144,708 | * 9/1992 | Pekar .................................. 137/223 |
| 5,248,275 | * 9/1993 | McGrath et al. .................... 446/224 |
| 5,372,487 | * 12/1994 | Pekar ........................ 137/512.15 X |
| 5,496,262 | 3/1996 | Johnson, Jr. et al. . |

FOREIGN PATENT DOCUMENTS

| | | |
|---|---|---|
| 4030717 A1 | 2/1992 | (DE) . |
| 1 180 487 | 4/1959 | (FR) . |

* cited by examiner

Primary Examiner—John Rivell
Assistant Examiner—Meredith H Schoenfeld
(74) Attorney, Agent, or Firm—Cantor Colburn LLP

(57) ABSTRACT

An exemplary embodiment of the invention is a flow control valve including a first sheet having a hole therein and a second sheet secured to said first sheet at a plurality of separate seal locations along a periphery of the first and second sheets. The seal locations define at least one channel between the seal locations. The second sheet has an aperture therein in fluid communication with the hole and selectively in fluid communication with the channel.

21 Claims, 4 Drawing Sheets

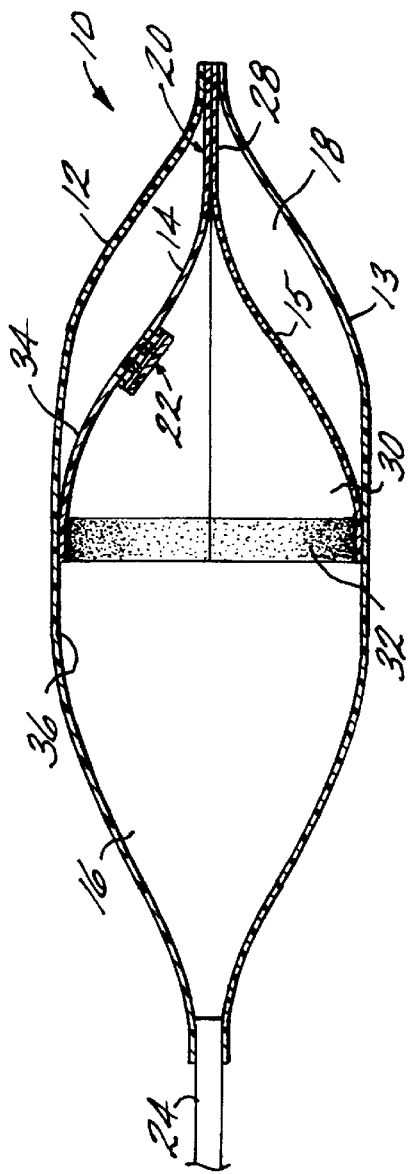
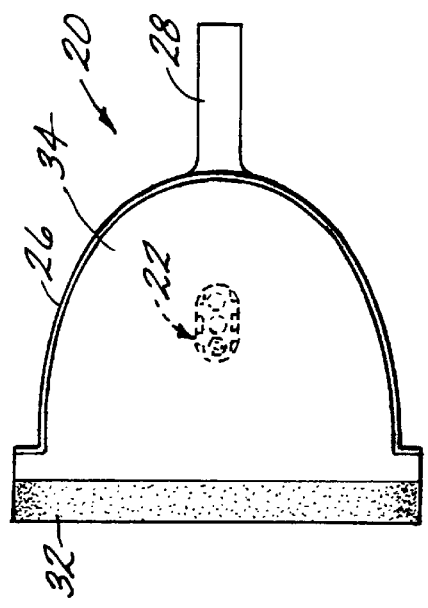
FIG. 1
FIG. 2

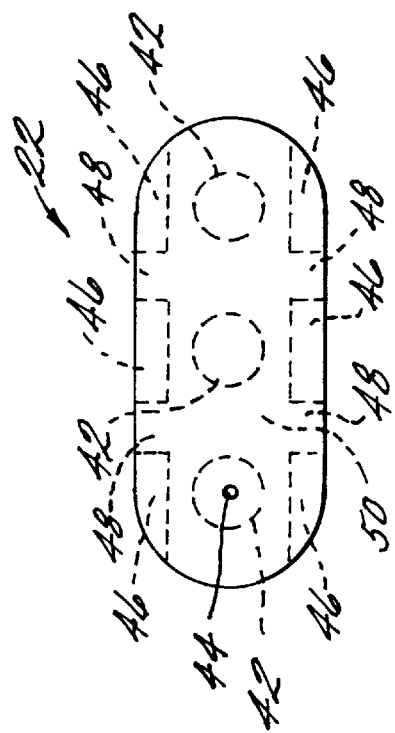
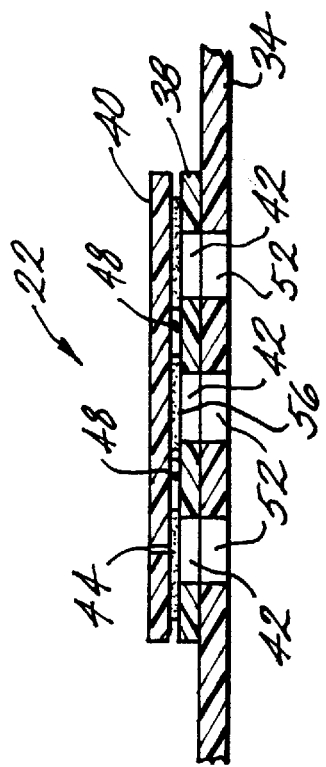
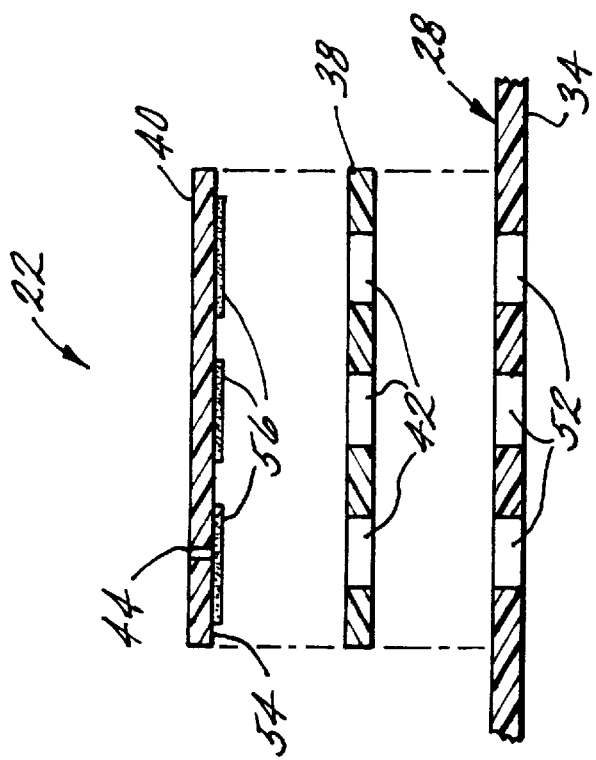

FLOW CONTROL VALVE

CROSS REFERENCE TO RELATED APPLICATIONS

This application claims the benefit of U.S. provisional patent application No. 60/105,123 filed Oct.21, 1998, the entire contents of which are incorporated herein by reference.

TECHNICAL FIELD

The present invention relates to inflatable bladders and more particularly, to a valve formed of layers of sheet material for controlling the inflation and deflation of an inflatable bladder.

BACKGROUND OF THE INVENTION

It is known in the art to use inflatable structures for many applications, such as seat cushions, mattresses and medical devices. Many of these structures require that the rate of inflation differ from the rate of deflation of the bladder. Complex mechanical valves are used to control the rate of inflation and deflation of the inflatable structures. In other instances, a pump is used to control the inflation and deflation of these structures.

BRIEF SUMMARY OF THE INVENTION

An exemplary embodiment of the invention is a flow control valve including a first sheet having a hole therein and a second sheet secured to said first sheet at a plurality of separate seal locations along a periphery of the first and second sheets. The seal locations define at least one channel between the seal locations. The second sheet has an aperture therein in fluid communication with the hole and selectively in fluid communication with the channel.

BRIEF DESCRIPTION OF THE DRAWINGS

The present invention will now be described, by way of example only, with reference to the accompanying drawings in which:

FIG. 1 is a sectional view of a bladder;

FIG. 2 is a top plan view of a baffle for the bladder of FIG. 1;

FIG. 3 is an exploded sectional view of a flow control valve;

FIG. 4 is a sectional view of the flow control valve of FIG. 3;

FIG. 5 is a top plan view of the flow control valve of FIG. 3;

DETAILED DESCRIPTION OF THE INVENTION

Figure 7:
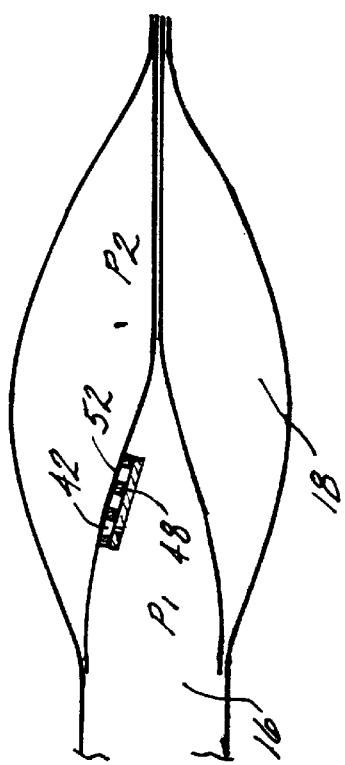
FIG. 7 is a sectional view of the bladder partially deflated.

Referring to FIG. 1, it is seen that a multi-chambered bladder, generally designated 10, comprises four layers of sheet material 12–15 sealed together to form a pair of chambers 16, 18. The bladder 10 is a single cell that is divided by an internal baffle 20. The bladder is inflatable with any fluid including air. A valve 22 is attached to the baffle to allow for a two stage inflation of the single bladder 10. As described herein, chamber 16 inflates faster than chamber 18. The bladder may be used for a medical device having the objective to apply pressure to the leg of the ankle first followed by the calf from a single air source with constant pressure. This type of staged pressure is known to stimulate blood circulation. The bladder 10 is inflated through an input port 24. The valve 22 allows both chambers 16, 18 of the cell 10 to deflate rapidly at about the same rate. This sets up the next cycle of pressurization to start with both segments at zero pressure. Historically one would use the two independent cells and a timed pumping cycle. The valve 22 allows for a single, unified divided bladder and a simple pumping system.

The bladder 10 is formed of two layers 12, 13 of sheet material, such as heat sealable thermoplastic material, superimposed on each other and heat sealed about its periphery. The baffle 20 is sealed between the two layers 12, 13 to form two chambers interconnected by the control valve 22.

Referring to FIGS. 1 and 2, the baffle 20 is formed of two layers 14, 15 of sheet material sealed along a portion of its outer edge at 26. The baffle includes and extension 28 to connect one end of the baffle 20 to the outer edge of the bladder 10. The extension 28 secures the bladder 20 to the outer sheets 12 and 13 and prevents the baffle 20 from turning back towards input port 24 during deflation. The inner surface 30 of the open end of the baffle is coated with a release material 32 to prevent the open ends of the baffle from sealing together when the outer surface 34 of the open ends of the baffle are sealed to the inner surface 36 of the cell 10.

The control valve 22 is sealed to the inner surface of one layer 14 of the baffle 20. The valve 22 restricts the air flow passing from the first chamber 16 to the second chamber 18, and thereby inflating the first chamber faster than the second chamber. Further, the control valve 22 allows the second chamber 18 to deflate at a faster rate. One will appreciate that the valve may be sealed to the outer surface 34 of the baffle 20 to reverse the inflation and deflation rates as described hereinbefore.

The control valve 20 of the present invention is similar to the inlet check valve described in U.S. Pat. No. 5,372,487 to Pekar for an "Inlet Check Valve For Pump Mechanism." As best shown in FIGS. 3–5, the control valve 22 is formed of an upper and lower layer 38, 40 of sheet material. The lower layer 38 includes a plurality of apertures 42 disposed therein. The upper layer 40 includes a hole 44 located to be in registered relations with one of the apertures 42 of the lower layer 38. The upper and lower layers 38, 40 are sealed at predetermined seal locations 46 to form a plurality of channels 48. A central channel 50 interconnects each of the holes 42 of the lower layer 38. Channels 48 radiate outward from the central channel 50 to provide a exhaust path for air passing through the lower layer 38. The valve 22 is sealed to the layer 34 of the baffle 20 (See FIG. 1) positioning the apertures 42 of the lower layer 38 of the valve with the holes 52 disposed in the layer 34 of the baffle 20. The lower layer 38 is heat sealed to the baffle 20 about the periphery of each of the apertures 42. The inner surface 54 of the upper layer 40 of the valve 22 is coated with a release material 56 to prevent the upper layer 40 from sealing to the lower layer 38 of the valve 22 about the apertures 42, and thereby seal off the channels 48, 50 of the valve.

Figure 6:
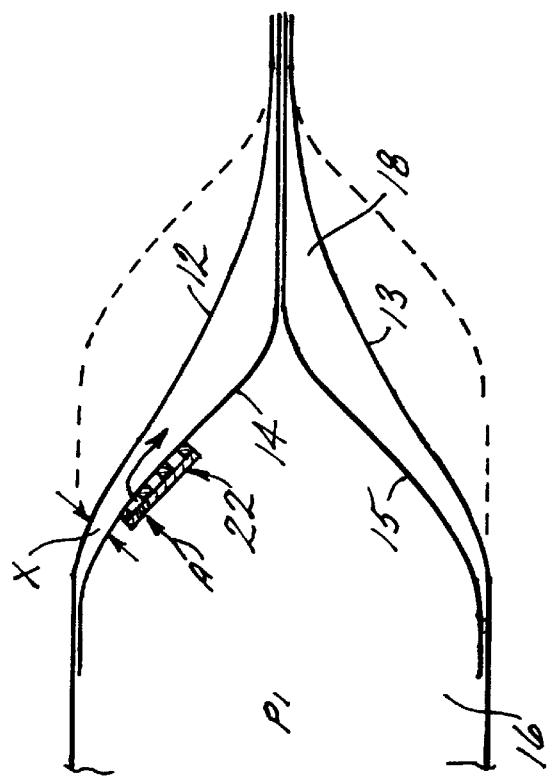
FIG. 6 is a sectional view of the bladder partially inflated.

During the inflation of the inflatable bladder 10 as shown in FIG. 6, air passes into the first chamber 16 through input port 24. A pressure P1 against the valve 22 forces the channels 48, 50 of the control valve to close and thereby force all the air to pass through the hole 44 disposed in the upper layer 40 of the control valve and through one aperture 42. Accordingly, the hole 44 and aperture 42 are in fluid communication. The diameter of the hole 44 determines the rate of inflation or delay of inflation of the second chamber 18. Preferably the hole (or fill element) 44 of the control valve 22 is positioned a sufficient distance from the outer layer 12 of the bladder 10, which allows for continuous uninterrupted flow of air from the first chamber 16 to the second chamber 18 as shown by arrow A. As shown in FIG. 6, the outer layer 12 of the second chamber 18 may cover the hole 44 and therefore a safe gap shown as X may be needed to provide for continuous inflation of the second chamber 18.

During the deflation of the inflatable bladder 10 as shown in FIG. 7, the air from the first chamber 16 deflates at a faster rate and therefore the pressure P2 in the second chamber 18 is greater than the pressure P1 in the first chamber 16. This pressure differential deflects upper layer 40 from lower layer 38 and opens channels 48. The air from second chamber 18 exits through each of the holes 52 in baffle 20 aligned with apertures 42 of the valve 22 and out channels 48. Thus, apertures 42 are in fluid communication with channels 48 and hole 44. The increased cross sectional area of the apertures 42 of the control valve permits the second chamber 18 to deflate at a much higher rate than it inflated. Conversely, during deflation, the pressure P1 in the first chamber drops quickly and in order to follow suit in a compressed time span, two relatively large apertures 42 of the valve 22 are located closer to the cross seal at 54 to allow maximum flow without blocking the apertures 42 as the baffle collapsed during deflation of the second chamber.

The rate of inflation of the second chamber 18 is dependent upon the cross sectional area of the hole 44 in the upper layer 40 of the control valve 22. The rate of deflation of the second chamber 18 is dependent upon the cross sectional area of the apertures 42 in the lower layer 38 of the control valve 22.

While the invention as described hereinbefore include a control valve 22 having three apertures 42 for deflating the second chamber 18 and a single hole 44 for inflating the second chamber 18, one skilled in the art will appreciate that control valve 22 do may include any number of holes 44 and apertures 42 to meet the desired rate of inflation and deflation.

Figure 9:
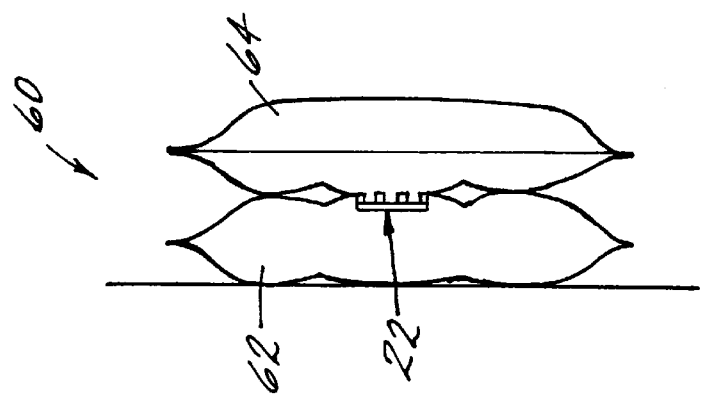
FIG. 9 is a sectional view of the bladder system of FIG. 8.
Figure 8:
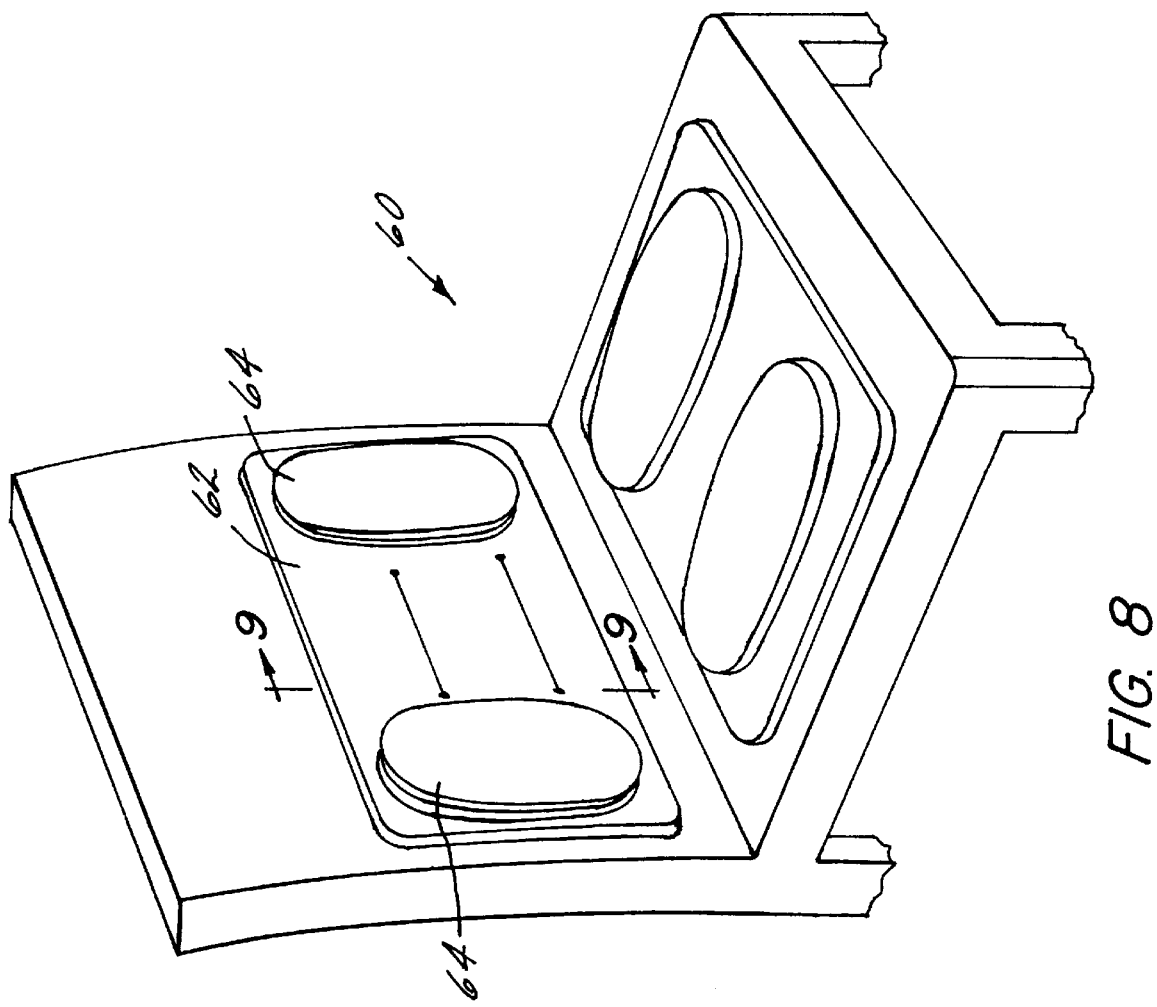
FIG. 8 is a perspective view of the alternative embodiment of a bladder system embodying the present invention.

FIGS. 8 and 9 illustrate another embodiment of the present invention, the inflation system is a back and seat cushion 60 having base inflation cushions 62 that feed side bolsters 64 utilizing the control valve 22 described hereinbefore. The control valve is sealed to the layer of a chamber disposed between the base chamber 62 and the bolster chamber 64.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A flow control valve comprising:
    a first sheet having a hole therein;
    a second sheet secured to said first sheet at a plurality of separate seal locations along a periphery of said first and second sheets, said seal locations defining at least one channel between said seal locations;
    said second sheet having an aperture therein, said aperture being in fluid communication with said hole and selectively in fluid communication with said channel.

2. The flow control valve of claim 1 wherein:
    in a first state, said channel is sealed; and
    in a second state said channel is in fluid communication with said aperture.

3. The flow control valve of claim 2 wherein:
    said first state occurs when a first pressure acting on a first side of said first sheet is greater than a second pressure acting on a second side of said first sheet.

4. The flow control valve of claim 2 wherein:
    said second state occurs when a first pressure acting on a first side of said first sheet is less than a second pressure acting on a second side of said first sheet.

5. The flow control valve of claim 1 wherein:
    said aperture in said second sheet includes a plurality of apertures, each of said apertures being selectively in fluid communication with said channel.

6. The flow control valve of claim 1 wherein:
    said channel includes a plurality of channels, each of said channels being selectively in fluid communication with said aperture.

7. The flow control valve of claim 1 wherein:
    said aperture in said second sheet includes a plurality of apertures,
    said channel includes a plurality of channels,
    each of said apertures being selectively in fluid communication with said channels.

8. The flow control valve of claim 2 wherein:
    said aperture in said second sheet includes a plurality of apertures, and
    in said first state, only one aperture is in fluid communication with said hole in said first sheet.

9. An inflatable bladder comprising:
    a first chamber;
    a second chamber;
    a flow control valve positioned in one of said first chamber and said second chamber, said flow control valve including:
        a first sheet having a hole therein;
        a second sheet secured to said first sheet at a plurality of separate seal locations along a periphery of said first and second sheets, said seal locations defining at least one channel between said seal locations;
        said second sheet having an aperture therein, said aperture being in fluid communication with said hole and selectively in fluid communication with said channel.

10. The inflatable bladder of claim 9 wherein:
    said first chamber has a wall having a wall opening in fluid communication with said aperture in said second sheet.

11. The inflatable bladder of claim 10 wherein:
    said flow control valve is positioned in said first chamber.

12. The inflatable bladder of claim 10 wherein:
    said flow control valve is positioned in said second chamber.

13. The inflatable bladder of claim 9 wherein:
    in a first state, said channel is sealed; and
    in a second state said channel is in fluid communication with said aperture.

14. The inflatable bladder of claim 13 wherein:

said first state occurs when a first pressure acting on a first side of said first sheet is greater than a second pressure acting on a second side of said first sheet.

15. The inflatable bladder of claim 13 wherein:

said second state occurs when a first pressure acting on a first side of said first sheet is less than a second pressure acting on a second side of said first sheet.

16. The inflatable bladder of claim 9 wherein:

said aperture in said second sheet includes a plurality of apertures, each of said apertures being selectively in fluid communication with said channel.

17. The inflatable bladder of claim 9 wherein:

said channel includes a plurality of channels, each of said channels being selectively in fluid communication with said aperture.

18. The inflatable bladder of claim 9 wherein:

said opening in said second sheet includes a plurality of apertures, said channel includes a plurality of channels, each of said apertures being selectively in fluid communication with said channels.

19. The inflatable bladder of claim 13 wherein:

said aperture in said second sheet includes a plurality of apertures, and in said first state, only one aperture is in fluid communication with said hole in said first sheet.

20. The inflatable bladder of claim 9 wherein:

said first chamber includes an extension located within and secured to said second chamber.

21. The inflatable bladder of claim 9 wherein:

said inflatable bladder is used to apply pressure to a body of a patient in stages thereby stimulating blood circulation.

* * * * *

UNITED STATES PATENT AND TRADEMARK OFFICE
CERTIFICATE OF CORRECTION

PATENT NO. : 6,196,260 B1
DATED : March 6, 2001
INVENTOR(S) : Robert W. Pekar

It is certified that error appears in the above-identified patent and that said Letters Patent is hereby corrected as shown below:

Column 2,
Line 23, after "includes" delete "and" and insert therefor -- an --
Line 25, after "the" (second occurrence) delete "bladder" and insert therefor -- baffle --
Line 42, after "valve" delete "20" and insert therefor -- 22 --
Line 53, before "42" delete "holes" and insert therefor -- apertures --
Line 54, after "provide" delete "a" and insert therefor -- an --
Lines 56 and 58, after "the" (first occurrence) delete "layer" and insert therefor -- outer surface --

Column 3,
Line 9, after "the" delete "outer"
Line 10, before "12" delete "layer" and insert therefor -- sheet material --
Line 13, after "6," delete "the outer layer" and insert therefor -- sheet material --
Line 41, after "hereinbefore" delete "include" and insert therefor -- includes --
Line 49, after "invention," insert -- wherein --
Line 53, after "base" delete "chamber" and insert therefor -- cushions --

Signed and Sealed this

Thirty-first Day of August, 2004

JON W. DUDAS
*Director of the United States Patent and Trademark Office*